July 5, 1955     H. C. SLECHTA     2,712,296
REGISTRATION INDICATOR FOR CORRUGATED TAPES
Filed Nov. 6, 1953
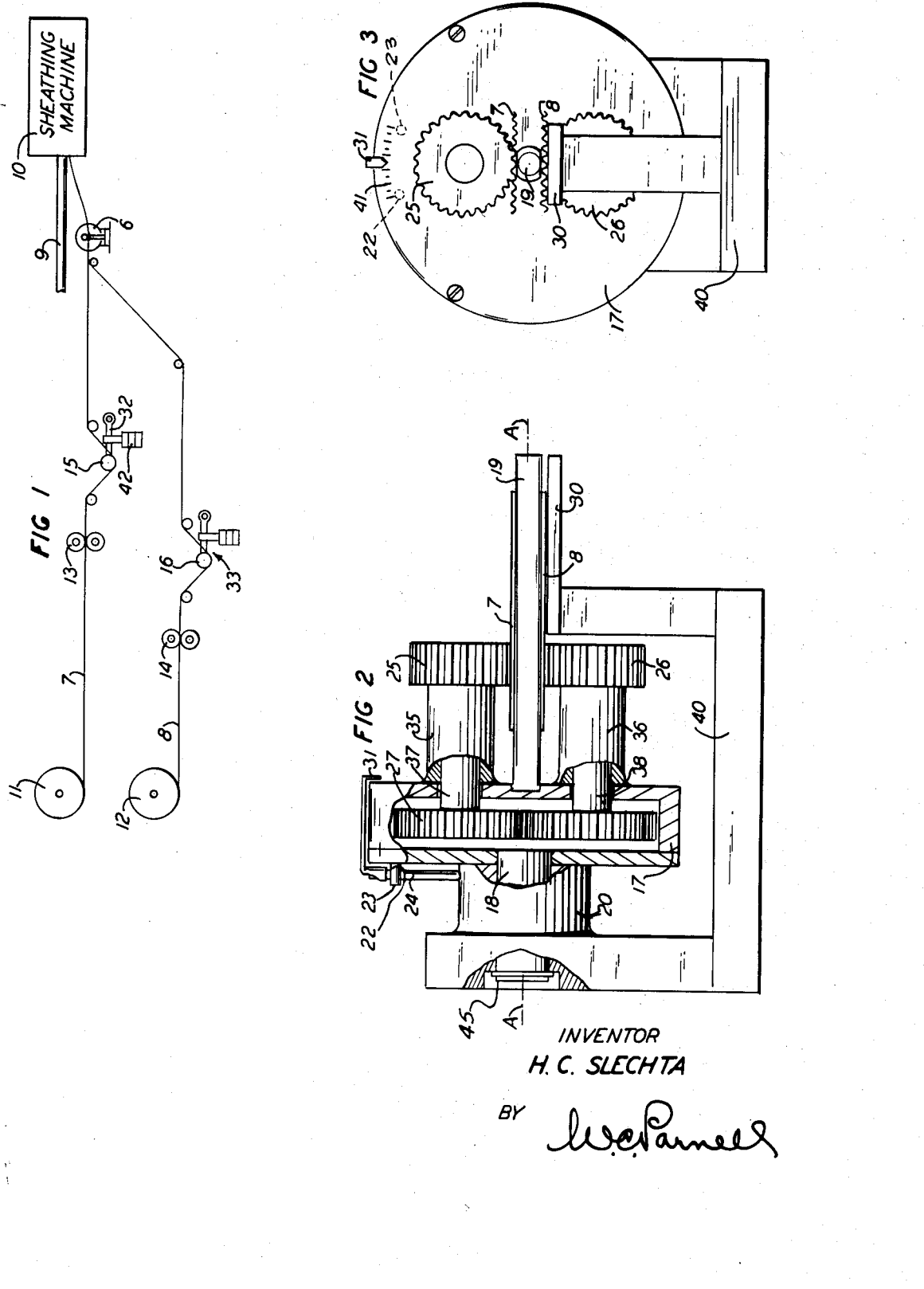
INVENTOR
H. C. SLECHTA

United States Patent Office 2,712,296
Patented July 5, 1955

2,712,296

REGISTRATION INDICATOR FOR CORRUGATED TAPES

Henry C. Slechta, Plainfield, N. J., assignor to Western Electric Company, Incorporated, New York, N. Y., a corporation of New York Application November 6, 1953, Serial No. 390,673

6 Claims. (Cl. 116—124)

This invention relates to a registration indicator for corrugated tapes and particularly to a device for indicating the relative spacings of corrugations in two tapes.

In the manufacture of telephone cable having corrugated aluminum and steel tapes which are formed around the cable core into a composite sheath therefor, the different physical properties of the two metals tend to produce a variable mismatch in the corrugations in the two tapes so that the two will not nest properly on the cable core. Due to the continuous motion of the two tapes while the sheath is being formed, it is difficult to detect these variations by visual observation.

It is the object of this invention to provide a device for automatically detecting registration deviations of the corrugations of two moving tapes.

In accordance with the general features of this invention, applicant has provided a device having a fixed base member, a housing mounted on the base for limited rotary motion, two shafts geared together at one end rotatably mounted in the housing, means fixed to the other ends of the shafts for engaging the corrugations of the two metal strips and for rotating the shafts and an indicator attached to the base for detecting the rotary displacement of the housing. Differences in the spacing of the corrugations of the two strips passing through the device produces a slight rotation of the housing due to the planetary motion of the one shaft about the other, the indication showing the rotary displacement of the housing therefore serves as a guide to the operator for producing corrective changes in the relative tensions of the two tapes.

These and other features of the invention will be more fully understood from the following detailed description taken in conjunction with the accompanying drawing in which:

Fig. 1 is a diagrammatic view of cable sheathing apparatus utilizing the indicator according to the invention;

Fig. 2 is an elevational view, partially in section, of the indicator of Fig. 1; and Fig. 3 is an end view of Fig. 2 showing the tape engaging gears of the indicator.

In the system shown in Fig. 1, aluminum and steel tapes 7 and 8 pay off their respective supply reels 11 and 12, pass through their respective corrugating rollers 13 and 14, over idler rollers 15 and 16, through the indicator 6 of the present invention into the sheath forming machine 10, where the two corrugated tapes are formed into a composite sheath on the cable 9.

The indicator, as shown in Figs. 2 and 3, has a fixed base member 40, a housing 17 and shaft 18, which are connected together, the shaft 18 being force-fitted in a hole in the housing or it may be welded thereto. The shaft 18 is journalled in a fixed bearing 20 and the end of the shaft has a spring retaining ring 45 in a circumferential groove therein to prevent axial movement of the shaft in the bearing. The housing and shaft may rotate about the axis A—A between limits determined by pins 22 and 23 on the housing 17 and the rod 24 projecting up from the fixed bearing 20. The pin 22 is shown partially broken away in Fig. 2 to show the pin 23 on the other side of rod 25 and in Fig. 3 the pins 22 and 23, being on the back side of the housing 17, are shown therein as dashed lines. Two identical gears 27 and 28, which are meshed together along the axis 21—21, are contained in the rotatably mounted housing 17, bearings 35 and 36 being provided therein for the shafts 37 and 38 respectively, to which the gears 27 and 28 are mounted. Driving gears 25 and 26, which are separated by a tape guiding shaft 19, are attached to the ends of shafts 37 and 38 respectively, extending out of the housing, the teeth thereof being designed to mesh with the corrugations of the tapes.

The corrugated aluminum tape 7 passes between shaft 19, fixed to the housing, and gear 25 while the steel tape 8 passes between the shaft 19 and gear 26. A fixed member 30, attached to the base 40, is provided for supporting the steel tape 8 which may extend beyond the gear 26, the shaft 19 serving as a support for the aluminum tape 7. The shaft 19 is generally cylindrical but has two flat, tape engaging surfaces on opposite sides thereof.

The tapes drive the gears 25 and 26 at speeds determined by the number of corrugations in the respective tapes and the speed at which the tapes are moving. These gears, in turn, drive the gears 27 and 28 which are meshed together. Since the two tapes move at identical speeds, as long as the corrugations per inch of the two tapes are exactly the same, the housing 17 remains stationary, but as soon as any discrepancy occurs, the housing tends to rotate thereby producing slight planetary rotation of one of the gears 27 or 28 about the other. The rotatable housing 17 is provided with a calibrated scale 41 which cooperates with the indicator 31 on the fixed rod 24. Displacement of the indicator 31 in either direction indicates when the number of corrugations per inch in the aluminum tape is too great or too small, as compared with those in the steel tape. This serves as a guide to the operator in adjusting the stretch of the aluminum tape by moving the weight 42 (Fig. 1) along the pivoted arm 32 which carries the idler roller 15 engaging the tape. In the event that this idler adjustment does not provide a sufficient range of correction, a similar variable tensioning device 33 on the steel tape may be adjusted in the opposite sense from the idler 15 for the aluminum tape.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A device for indicating the registration of the corrugations of two tapes comprising a fixed base member, two gears, a housing for the gears mounted to the base for limited rotary motion thereon, a shaft connected to each of said gears, fixed bearings in the housing for the shafts spaced to mesh the gears along the axis of rotation for the housing, means attached to the shafts for engaging the corrugations of the two tapes, means attached to the housing for holding the tapes in engagement with the corrugation enaging means on the shafts and means for indicating rotary displacement between the housing and the base.

2. A device for indicating the registration of the corrugations of two tapes comprising a fixed base member, a housing mounted to the base for limited rotary motion thereon, two shafts, one end of each of the two shafts being geared to the other, said shafts being mounted in fixed space relation for rotation in the housing, means connecetd to the shafts for engaging the corrugations of the tapes, means attached to the housing for holding the tapes in engagement with the corrugation engaging means on the shafts, a graduated scale on the housing and an indicator mounted to the base cooperating with said scale to indicate the amount the corrugations of one tape are out of register with the corrugations of the other tape.

3. A device for indicating the registration of the corrugations of two tapes comprising a fixed base member, two gears, a housing for the gears mounted for limited rotary motion on the base, a shaft connected to each of the gears rotatably mounted in the housing to mesh the gears along the axis of rotation for the housing, corrugation engaging gears attached to the shafts, a member mounted to the housing interposed between the corrugation engaging gears for meshing the corrugations of each of the tapes with its respective gear and means for indicating rotary displacement between the housing and the base.

4. A device for indicating the registration of the corrugations of two tapes comprising a fixed base member, two gears, a housing for the gears mounted for limited rotary motion on the base, a shaft connected to each of said gears, fixed bearings in the housing for the shafts spaced to mesh the gears along the axis of rotation for the housing, corrugation engaging gears attached to the shafts, a member mounted to the housing interposed between the corrugation engaging gears for meshing the corrugations of each of the tapes with its respective gear, a graduated scale on the housing and a pointer mounted to the base cooperating with the scale to indicate the amount the corrugations of one tape are out of register with the corrugations of the other tape.

5. A device for indicating the difference in the number of corrugations per unit length of two tapes moving at substantially the same speed and in the same direction comprising a fixed base member, two gears, a housing for the gears mounted for limited rotary motion on the base, a shaft connected to each of the gears rotatably mounted in the housing to mesh the gears along the axis of rotation for the housing, corrugation engaging gears attached to the shafts, a member mounted to the housing interposed between the corrugation engaging gears for meshing the corrugations of each of the tapes with its respective gear to drive each shaft at a speed proportional to the number of corrugations per unit length of its respective tape and means to indicate the planetary displacement of the gears.

6. A device for indicating the difference in the number of corrugations per unit length of two tapes moving at substantially the same speed and in the same direction comprising a fixed base member, two gears, a housing for the gears mounted to the base for limited rotary motion thereon, a shaft connected to each of the gears, fixed bearings in the housing for the shafts spaced to mesh the gears along the axis of rotation for the housing, means attached to the shafts for engaging the corrugations of the two tapes and for driving each shaft at a speed proportional to the number of corrugations per unit length of its respective tape and means for indicating rotary displacement between the housing and the base.

No references cited.